US012674691B2

(12) United States Patent
Potnin et al.

(10) Patent No.: US 12,674,691 B2
(45) Date of Patent: Jul. 7, 2026

(54) SYSTEMS AND METHODS FOR A SPATIALLY AWARE CONTROL DEVICE

(71) Applicant: Microsoft Technology Licensing, LLC, Redmond, WA (US)

(72) Inventors: Petr Potnin, Seattle, WA (US); Brett Andrew Tomky, Seattle, WA (US); Insang Hwang, Sammamish, WA (US); Andrew James Hillenius, Woodinville, WA (US); Devin Samuel Jacob Caplow-Munro, Seattle, WA (US); Denys Yaremenko, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 18/412,137

(22) Filed: Jan. 12, 2024

(65) Prior Publication Data

US 2025/0231053 A1     Jul. 17, 2025

(51) Int. Cl.
G01D 13/26 (2006.01)
H04N 23/695 (2023.01)
H04N 23/698 (2023.01)

(52) U.S. Cl.
CPC ........... G01D 13/26 (2013.01); H04N 23/695 (2023.01); H04N 23/698 (2023.01)

(58) Field of Classification Search
CPC ..... G01D 13/26; H04N 23/695; H04N 23/698
See application file for complete search history.

(56) References Cited

U.S. PATENT DOCUMENTS 6,346,962 B1    2/2002  Goodridge
7,027,041 B2 *  4/2006  Nishimura ............. G09B 19/00
                                              345/173

(Continued)

FOREIGN PATENT DOCUMENTS

CN        110095923 A      8/2019
JP          6370165 B2 *   8/2018  ............... G01C 1/04

OTHER PUBLICATIONS

Lim, et al., "Fast and Reliable Camera-tracked Laser Pointer System Designed for Audience," Proceedings of the 5th International Conference on Ubiquitous Robots and Ambient Intelligence (URAI 2008), 2008, pp. 529-534.

(Continued)

*Primary Examiner* — Brian A Zimmerman
(74) *Attorney, Agent, or Firm* — Ray Quinney & Nebeker P.C.; John O. Carpenter

(57) ABSTRACT

A control device may include a processor. A control device may include a communication device operable to data communicate with the processor. A control device may include a positional sensor operable to data communicate with the processor. A control device may include an orientation sensor operable to data communicate with the processor. A control device may include a ranging device operable to data communicate with the processor. A control device may include a hardware storage device operable to data communicate with the processor, the hardware storage device having instructions stored thereon that, when executed by the processor, cause the control device to, based at least partially on receiving a pointer request: determine pointer information relative to the control device from the ranging device and the orientation sensor, and transmit the pointer information to a base device.

20 Claims, 7 Drawing Sheets

(56) References Cited

U.S. PATENT DOCUMENTS

| | | | |
|---|---|---|---|
| 7,836,302 B2 * | 11/2010 | Morrow | G06F 11/2294 |
| | | | 713/165 |
| 8,471,812 B2 | 6/2013 | Bunch | |
| 9,294,669 B2 * | 3/2016 | Glover | H04N 23/66 |
| 10,999,555 B1 | 5/2021 | Mautino et al. | |
| 11,113,983 B1 * | 9/2021 | Fieldman | G09B 5/065 |
| 2004/0140964 A1 | 7/2004 | Wang et al. | |
| 2005/0270494 A1 | 12/2005 | Banning | |
| 2009/0091532 A1 | 4/2009 | Hockett | |
| 2013/0106986 A1 * | 5/2013 | Abe | H04N 7/15 |
| | | | 348/14.08 |
| 2014/0009632 A1 * | 1/2014 | Glover | H04N 23/695 |
| | | | 348/211.99 |
| 2018/0054561 A1 * | 2/2018 | Morita | H04M 1/72412 |
| 2021/0373676 A1 | 12/2021 | Jorasch et al. | |

OTHER PUBLICATIONS

Extended European Search Report received for EP Application No. 25150366.0, mailed on Feb. 4, 2025, 12 Pages.
Zhiyun-Tech, "Zhiyun Crane 4 Official Tutorial Part 1: Setup and Balance", Retrieved from internet URL: https://www.youtube.com/watch?y=-MNj6HOLUsk, Aug. 3, 2023, 02 Pages.

* cited by examiner

100

116
118
106
104
114
102
110
112
108

202
208
206
224
223-1
220
222
226
228
214,216
210
232
212
230
223-2
234

SYSTEMS AND METHODS FOR A SPATIALLY AWARE CONTROL DEVICE

BACKGROUND

Hybrid meetings and presentations are increasingly important to working lives. In these contexts, video cameras and microphones attempt to record or broadcast a presenter, as well as objects, text, or diagrams in the physical room with the presenter for viewing by a remote audience.

BRIEF SUMMARY

In some aspects, the techniques described herein relate to a control device including: a processor; a communication device operable to data communicate with the processor; a positional sensor operable to data communicate with the processor; an orientation sensor operable to data communicate with the processor; a ranging device operable to data communicate with the processor; a hardware storage device operable to data communicate with the processor, the hardware storage device having instructions stored thereon and executable by the processor to cause the control device to: upon receiving a pointer request: determine pointer information relative to the control device from the ranging device and the orientation sensor, and transmit the pointer information to a base device.

In some aspects, the techniques described herein relate to a presentation system including: a control device including: a processor, a communication device operable to data communicate with the processor, a positional sensor operable to data communicate with the processor, an orientation sensor operable to data communicate with the processor, a ranging device operable to data communicate with the processor, and a hardware storage device operable to data communicate with the processor, the hardware storage device having instructions stored thereon and executable by the processor to cause the control device to: upon receiving a pointer request: determine pointer information relative to the control device from the ranging device and the orientation sensor, and transmit the pointer information; and a base device including: a camera having a field of view (FOV), a processor, and a hardware storage device having instructions stored thereon and executable by the processor to cause the base device to: obtain the positional information of the control device, move the FOV based at least partially on the positional information, receive the pointer information, and in response to receiving the pointer information, move the FOV based at least partially on the pointer information.

In some aspects, the techniques described herein relate to a method including: at a base device: obtaining positional information of a control device; moving a field of view (FOV) of a capture device based on the positional information in a tracking state; obtaining pointer information of a point-of-interest (POI) from the control device; changing to a POI state; and moving the FOV of the capture device based on the pointer information while in the POI state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 through FIG. 3-5 illustrate a method of capturing a presentation with a presentation system, according to at least some embodiments of the present disclosure.

FIG. 4-1 and FIG. 4-2 illustrate a method of moving a field of view (FOV) by selection of a sub-FOV, according to at least some embodiments of the present disclosure.

FIG. 5 is an example of object detection and/or recognition to stabilize tracking based on positional information, according to at least some embodiments of the present disclosure.

DETAILED DESCRIPTION

Figure 1:
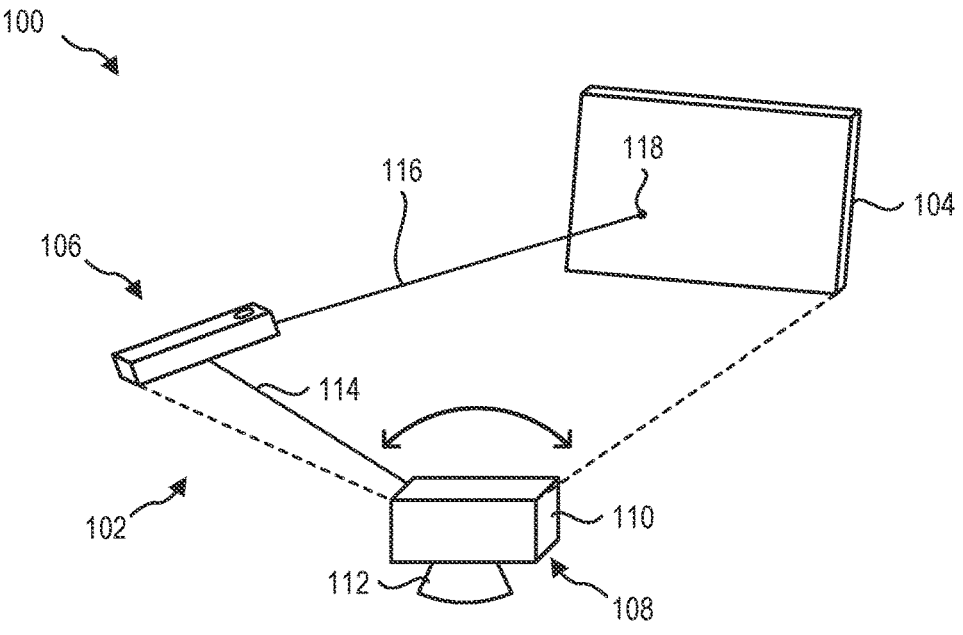
FIG. 1 is a perspective view of a presentation environment, according to at least some embodiments of the present disclosure.

The present disclosure relates generally to systems and methods for presenting video information to a remote viewer. More particularly, the present disclosure relates to embodiments of systems and methods of controlling a presentation device to intelligently capture and transmit subjects or objects of interest during the live presentation. In some embodiments, a presentation system includes a base device and a control device. The base device includes a camera, microphone, or other capture device that records information from a live presentation and, in some embodiments, transmits the captured video and/or audio information. The control device is operable to data communicate with the base device and configured to provide positional and vector information to the base device. The positional and vector information instruct the base device to move a field of view (FOV) of the capture device and/or select a sub-FOV of the capture device based on a movement or orientation of the control device. In some embodiments, the control device includes a ranging sensor, such as a time-offlight (TOF) sensor, that allows the control device to instruct the base device to image or record a point in space determined by the control device.

It can be important for the camera view shown to remote participants to intelligently track both the presenter and the content of the presentation. Further complicating this problem, sometimes that content is physically present in the meeting room, rather than digitally present on the presenting device. In a conventional presentation system, a camera may identify a tracked device, such as a handheld human interface device (HID) that a presenter holds. The camera may follow the presenter during the presentation. When presenting digital information, such as via software, a video presentation can display the digital information independently of the camera while the camera follows the presenter. However, during a hybrid presentation, when the object or subject of interest during the presentation is physically present local to (e.g., in the same physical environment as) the presenter, the camera remains tracked on the tracked device. The remote audience viewing the presentation on a display device is therefore unable to view the other object or subject of interest during the presentation without separate and control or manipulation of the capture device.

In some embodiments, systems and methods, according to the present disclosure, allow a presenter to instruct a base device including a camera, microphone, or another capture device to image or record the presenter or another object or subject of interest during the presentation automatically. In some embodiments, a control device is operable to data communicate with the base device to transmit positional information of the control device relative to the base device, and the base device tracks and records the area proximate to the control device. Upon receipt of a pointer request, such as by depressing an input button on the control device, the control device measures a distance to an object or subject of interest and measures a vector location from the control device. The control device and/or base device uses the vector information and positional information to change the tracking focus of the base device to the indicated object or subject of interest. In some embodiments, upon termination of the pointer request, the base device returns to tracking the control device based on the positional information.

In at least one example, a camera on a gimbal tracks a presenter on a stage holding a control device that transmits positional information to the gimbal. When the presenter presses a button on the control device to use a laser pointer of the control device to indicate a prototype model (i.e., object or subject of interest) on stage with the presenter, the control device measures a pointer position of the laser pointer relative to the control device. The control device transmits the pointer position to the gimbal, and the camera moves to image the pointer position and prototype model. Upon release of the button on the control device, the control device terminates transmission of the pointer position and returns to transmitting the positional information of the control device. The gimbal moves the camera back to the control device (and presenter) based on the positional information. Embodiments of control devices and base devices according to the present disclosure provide intuitive and semi-automated imaging and recording of the presentation without predetermined scripting or camera planning.

FIG. 1 is a schematic illustration of a presentation environment 100 including a presentation system 102 and an object of interest 104. In some embodiments, the presentation system 102 includes a control device 106 and a base device 108. The base device 108 includes a capture device 110 and, in some embodiments, a gimbal 112 or other device for moving a FOV of the capture device 110. In some embodiments, the capture device 110 is stationary and the FOV of the capture device 110 moves through digital selection of a sub-FOV, as will be described in more detail herein.

In some embodiments, the base device 108 is operable to data communicate with the control device 106. For example, the base device 108 and control device 106 may be in wireless communication with one another via radio frequency (RF) communications. In some embodiments, the RF communications transmit at least positional information 114 of the control device 106 relative to the base device 108. In some embodiments, the wireless communication device transmits pointer information 116 from the control device 106 to the base device 108.

In some embodiments, the positional information 114 is determined by the wireless communication device that transmits the positional information 114. For example, the positional information 114 may be measured by orthogonal directional and positional RF measurements of an RF transceiver, such as a WiFi transceiver, a Bluetooth transceiver, or other frequency and/or protocol transceiver that also transmits the positional information 114. In some embodiments, the positional information 114 is measured by dedicated positional sensor, such as an ultra-wideband (UWB) transceiver. In some examples, a UWB transceiver of the control device 106 and the base device 108 measures the relative position of the control device 106 and the base device 108, while a separate wireless communication device transmits the positional information 114 and/or other information between the control device 106 and the base device 108.

In some embodiments, the pointer information 116 is determined by the control device 106. The pointer information 116 describes the location of a point-of-interest (POI) 118 relative to the position of the control device 106. For example, the pointer information 116 may be a pointer vector relative to the control device 106 as an origin of the point vector. In some embodiments, the control device 106 includes an orientation sensor, such as an accelerometer, and ranging device, such as a time-of-flight (TOF) sensor, to measure the orientation of the control device 106 and a distance from the control device 106 to the POI 118. In some embodiments, the control device 106 includes a visible light, such as a laser, that visually indicates the POI 118 to the presenter or viewers of the presentation. By measuring the orientation of the control device 106 and the distance of the POI 118 from the control device 106, a pointer vector (e.g., inclination, azimuth, and distance) is determined relative to the position of the control device 106.

In some embodiments, the presentation system 102 moves the capture device 110 to image the control device 106 and area around the control device 106 based on the positional information 114, and the presentation system 102 moves the capture device 110 based on the pointer information 116 and the positional information 114. For example, the presentation system 102 determines the relative position of the control device 106 to the base device 108 by the positional information 114, and the presentation system 102 determines the relative position of the POI 118 and the base device 108 by the combination of the positional information 114 and the pointer information 116.

Figure 2:
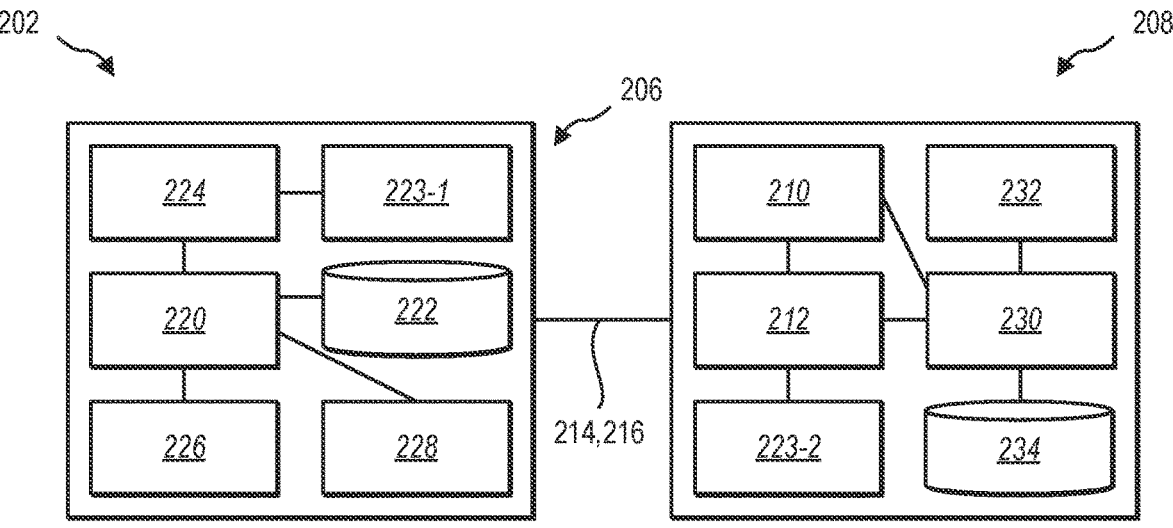
FIG. 2 is a system diagram of the components of a presentation system, according to at least some embodiments of the present disclosure.

FIG. 2 is a system diagram of the components of an embodiment of a presentation system 202. The presentation system 202 includes a control device 206 and a base device 208. The control device 206, in some embodiments, includes a processor 220 that is in communication with a hardware storage device 222. The hardware storage device 222 has instructions stored thereon that, when executed by the processor 220, cause the control device 206 to perform at least part of any method described herein. In some examples, the processor is a general-use processor. In some examples, the processor is a system on chip or application specific integrated circuit. In some embodiments, the hardware storage device 222 is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

The processor 220 is further in communication with a positional sensor 223-1 configured to determine positional information 214 relative to the base device 208 and an orientation sensor 224 and a ranging device 226 configured to determine pointer information 216 relative to the control device 206.

In some embodiments, the positional sensor 223-1 of the control device 206 communicates with a positional sensor 223-2 of the base device 208. For example, the positional sensors 223-1, 223-2 may be UWB transceivers that communicate with one another to determine the relative position of one another in three-dimensions. In some embodiments, the positional sensors 223-1, 223-2 are RF antennas that determine at least one of azimuth, inclination, and distance between the control device 206 and the base device 206. In some embodiments, the positional information 214 is determined at the control device 206 and transmitted to the base device 208. In some embodiments, the positional information 214 is determined at both the control device 206 and the base device 208. In some embodiments, the positional information 214 is determined at the base device 208 only. For example, the control device 206 transmits a beacon signal to the base device 208, and the control device 206 may be unaware of the relative location of the control device 206 to the base device 208, as the base device 208 tracks the control device 206 and the control device 206 need not be aware of the relative position.

In some embodiments, the orientation sensor 224 is or includes an accelerometer, a gyroscope, a compass, or combinations thereof. For example, the orientation sensor 224 measures the orientation of the control device 206 in space, such as measuring the azimuth and inclination of the control device 206. In some embodiments, the orientation sensor 224 measures the orientation of the ranging device 226 in space. For example, the ranging device 226 emits a signal to measure a distance from the ranging device to a POI (such as described in relation to the POI 118 of FIG. 1). The orientation sensor 224 is configured to measure the axial orientation of the signal emitted by the ranging device 226.

In some embodiments, the ranging device 226 emits an infrared (IR) or other electromagnetic signal and measures a distance from the ranging device 226 to a POI by measuring a TOF of the signal to (and reflected by) an object at the POI. For example, the ranging device 226 emits an IR signal that travels from the ranging device 226 to the POI, reflects from a surface of an object at the POI, and the ranging device detects the reflected signal. In some embodiments, the ranging device measures the distance to the POI by the elapsed time of the round-trip signal. The ranging device 226 and orientation sensor 224, in combination, can measure a pointer vector from the control device 206 to the POI.

The control device 206 transmits at least one of the positional information 214 and pointer information 216 to the base device 208 via a communication device 228. The base device 208 receives the transmitted information with a second communication device 232. In some embodiments, the base device 208 includes a processor 230 in communication with the communication device 232 and a hardware storage device 234 operable to data communicate with the processor 230 that has instructions stored thereon that, when executed by the processor 230, cause the base device 208 to perform at least part of any method described herein.

The processor 230 of the base device 208 is further in communication with a capture device 210. In some embodiments, the base device 208 further includes a gimbal 212 or other device for supporting and moving at least part of the capture device 210. The processor 230 may be in communication with the gimbal 212 or other device to control the movement of the capture device 210. In some embodiments, the base device 208 lacks a gimbal 212 or other device for moving at least part of the capture device 210. In such embodiments, the processor 230 receives video information or audio information from the capture device 210 in a full FOV, and the processor 230 selects a sub-FOV from the full FOV based at least partially on the positional information 214 and/or the pointer information 216. In some embodiments, the gimbal 212 allows a broad range of movement of the capture device 210, such as 360° azimuthal and/or 180° inclination range of movement.

In some embodiments, the capture device 210 is or includes a camera to capture video information. In some embodiments, the capture device 210 is or includes a directional microphone or focused microphone (i.e., parabolic) to capture audio information from a specific direction or audio field. In some embodiments, the capture device 210 records both video information and audio information.

Figures 1, 3:
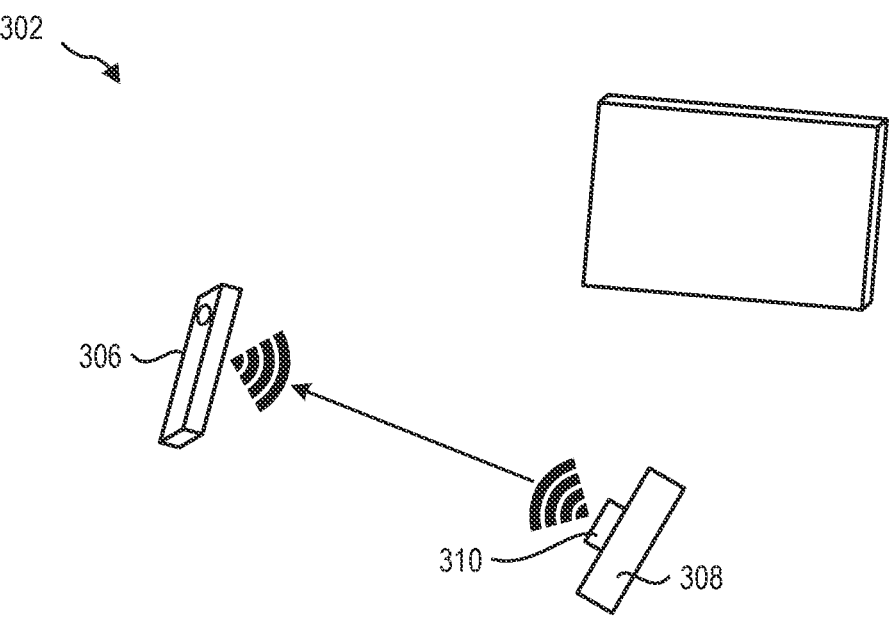
Figures 2, 3:
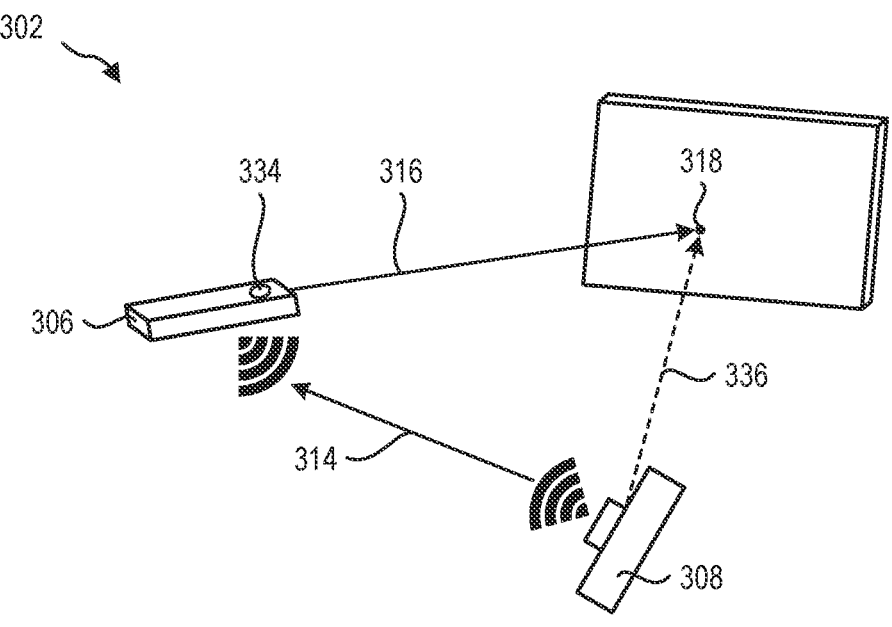
Figure 3:
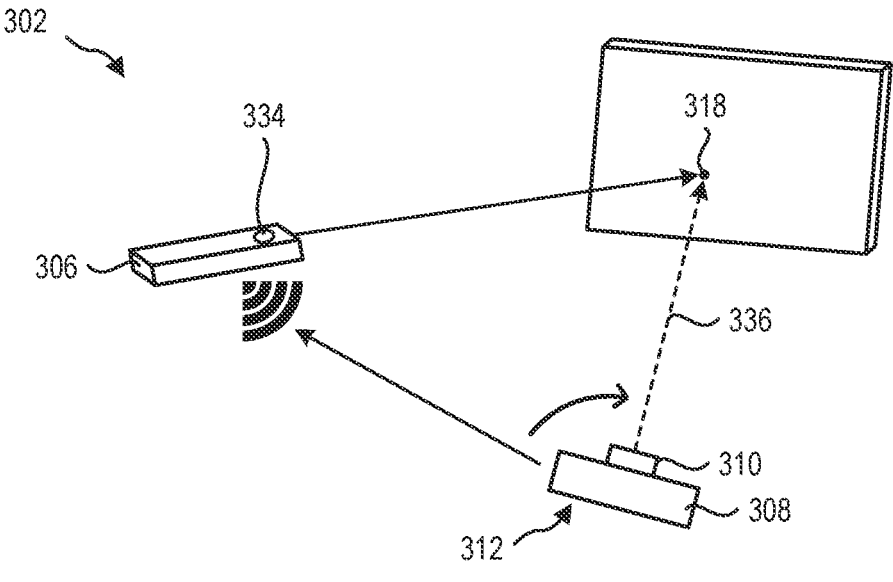

FIG. 3-1 through FIG. 3-5 illustrate an embodiment of a method of capturing a presentation with a presentation system, according to the present disclosure. Referring now to FIG. 3-1, a control device 306 (such as any embodiment of a control device described in relation to FIG. 1 or FIG. 2) and the base device 308 communicate with one another. The base device 308 obtains positional information of the relative position of the control device 306 relative to the base device 308. In some embodiments, the positional information includes at least azimuthal information. For example, some presentations occur within a single horizontal plane, and azimuthal information may be sufficient to track the position of the control device 306 relative to the base device 308 during the presentation. In some embodiments, the positional information includes at least azimuthal and inclination information. For example, some presentations with horizontal and vertical movement still occur with limited changes in distance from the capture device (such as presentations on a stage), and azimuthal and inclination information may be sufficient to track the position of the control device 306 relative to the base device 308. In some embodiments, the positional information includes at least azimuthal, inclination, and depth information. For example, the capture device 310 may have a focal length, such as a camera with an adjustable lens (or lens stack) that allows for adjustments according to depth of captured object or area.

In some embodiments, the positional information is determined at the control device 306 and transmitted to the base device 308. In some embodiments, the positional information is determined at both the control device 306 and the base device 308 simultaneously, such as in some UWB systems. In some embodiments, the positional information is determined at the base device 308, such as when the control device 306 is either passive or when the control device 306 transmits a beacon signal, which the base device 308 then uses to calculate the positional information of the control device 306.

FIG. 3-2 illustrates the control device 306 of FIG. 3-1 transitioning to a POI state, such as by a user depressing a pointer button 334 on the control device 306. In some embodiments, the control device 306 emits a signal to measure a distance from the control device 306 to a POI 318, as described herein. The orientation sensor and ranging device of the control device 306 determine the pointer information 316 from the control device 306 to the POI 318, for example, in a pointer vector. The presentation system 302, in some embodiments, sums the pointer information 316 and the positional information 314 to determine a POI vector 336 from the base device 308 to the POI 318. For example, the presentation system 302 sums the pointer vector (from the control device 306 to the POI 318) and a positional vector (from the base device 308 to the control device 306) while in the POI state to determine the POI vector 336 from the base device 308 to the POI 318.

In some embodiments, a pointer request initiates the POI state in which the control device 306 transmits the pointer information 316 to the base device 308. In some embodiments, the pointer request is received from the pointer button 334 on the control device 306. In some examples, the presentation system 302 is in the POI state while the pointer button 334 is held depressed. In some examples, the presentation system 302 is toggled between the tracking state and the POI state upon the control device receiving the pointer request when the pointer button 334 is pressed. For example, the presentation system 302 is toggled between the tracking state and the POI state upon receiving a first pointer request when the pointer button 334 is pressed and the base device 308 is in the tracking state, and the presentation system 302 is toggled between the POI state and the tracking state upon receiving a second pointer request when the pointer button 334 is pressed and the base device 308 is in the POI state.

While in the POI state, the presentation system 302 images or records the POI 318 with the base device 308 (and capture device 310 thereof), such as illustrated in FIG. 3-3. For example, the base device 308 moves the capture device 310, such as by a gimbal 312, based on the POI vector 336 from the base device 308 to the POI 318. In some embodiments, while in POI state, the base device 308 updates the orientation (or FOV) of the capture device 310 to image or record the POI 318 indicated by the control device 306. For example, while the pointer button 334 is depressed, the control device 306 transmits updated pointer information while the control device 306 moves and the POI 318 moves. In some embodiments, the presentation system 302 enters the POI state and moves the capture device 310 to image or record the POI 318 until the control device 306 terminates the POI state and transmits a termination request to the base device 308. Upon receipt of the termination request, the base device 308 terminates the POI state and returns to the tracking state, during which the base device 308 directs the capture device 310 at the control device 306.

Figures 3, 4:
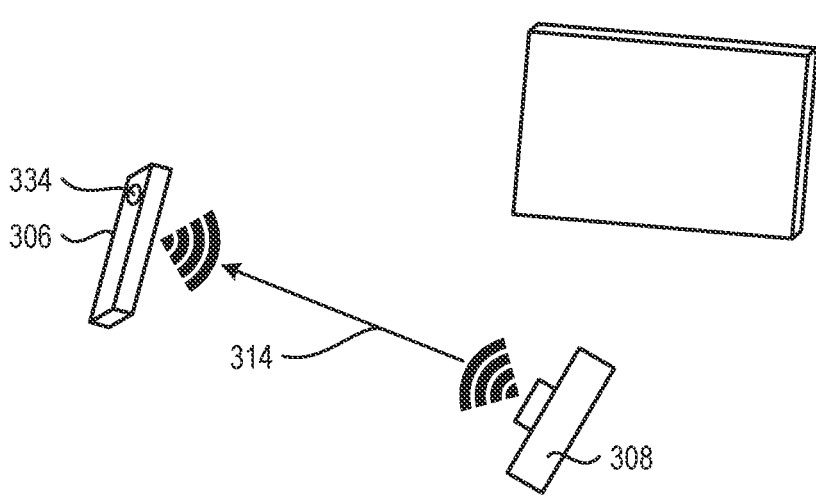

FIG. 3-4 illustrates the presentation system 302 of FIG. 3-3 returning to a tracking state of the control device 306. For example, the pointer button 334 of the control device 306 may be released, which provides a termination request to the base device 308 by ending the prior pointer request and terminates the POI state. In another example, the pointer button 334 of the control device 306 is depressed a second time, which transmits a termination request to the base device 308 to terminate the POI state. In some embodiments, the base device 308 returns to an original orientation and position of the control device 306 upon termination of the POI state. In some embodiments, new positional information 314 is obtained by the base device 308 (either by determination at the base device 308 or received from the control device 306), and the base device 308 orients the capture device 310 based on the new positional information of the control device 306.

Figures 3, 4, 5:
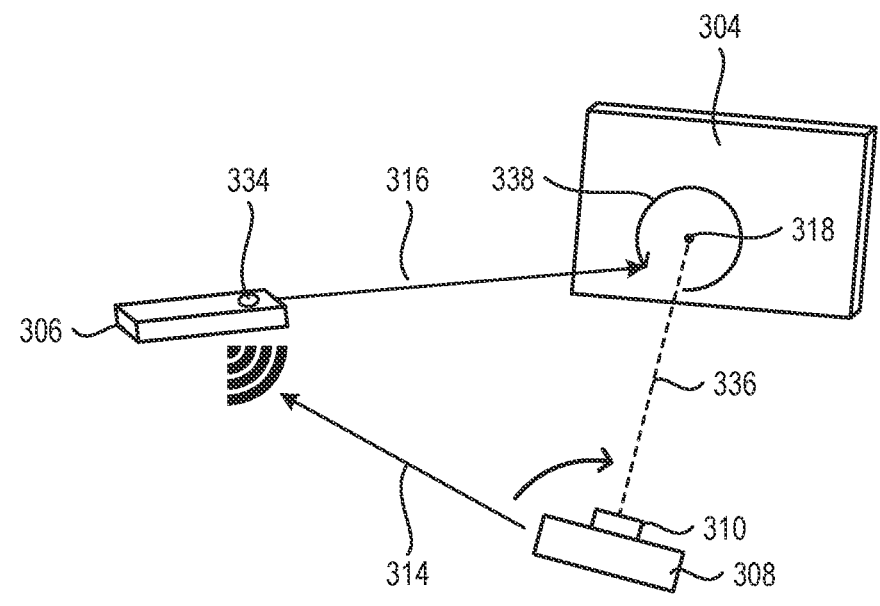
Figures 1, 4:
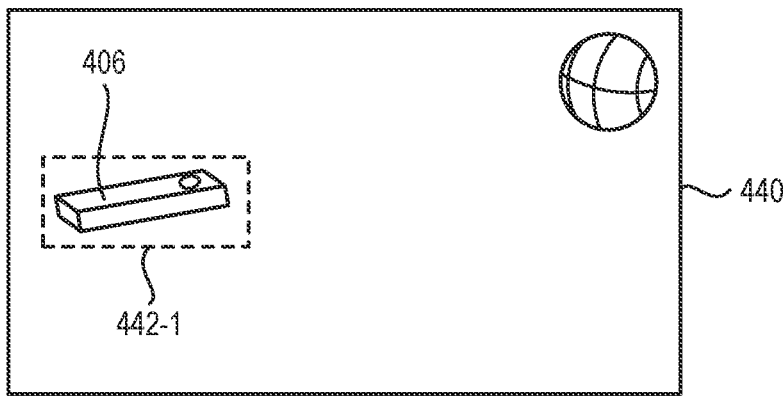
Figures 2, 4:
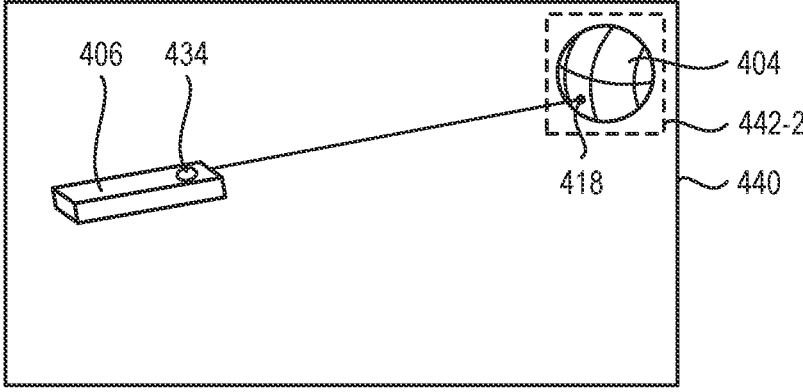
Figure 5:
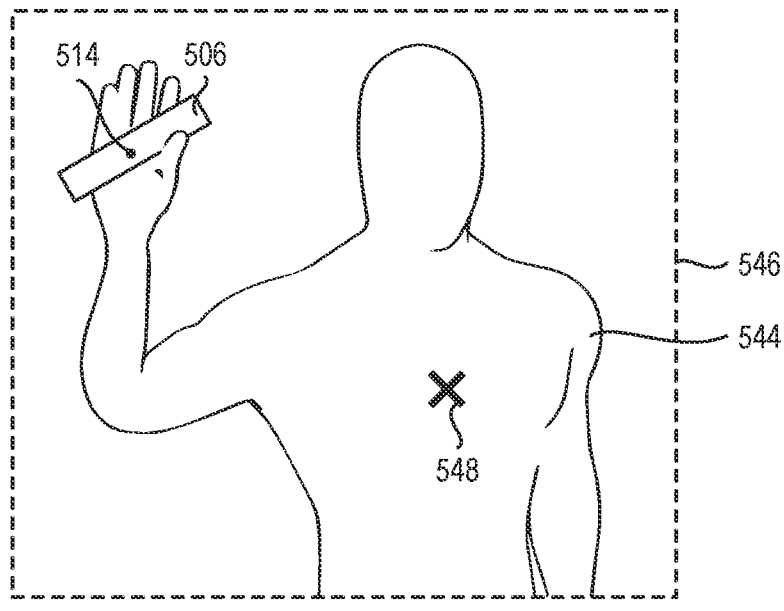

In some embodiments, the presenter wants to indicate an object or region that is larger than the POI. For example, FIG. 3-5 illustrates an embodiment of the control device 306 indicating an area of interest (AOI) 338 on the object 304 by pointing the control device 306 at the object 304 and gesturing the control device 306 in a circle, a rectangle, a square, an ellipse, an irregular shape, or other shape that indicates an area. In some embodiments, the orientation sensor and the ranging device of the control device 306 record measurements substantially continuously while the pointer button 334 remains depressed. In some embodiments, the control device 306 calculates the AOI 338 indicated by the measured user's movement of the control device 306, and the pointer information 316 includes area information of the AOI 338 at the end of the pointer vector. In some embodiments, the control device 306 transmits a plurality of pointer vectors in the pointer information 316 to the base device 308, and the base device 308 calculates the area information of the AOI 338 at the end of the POI vector 336. The base device 308, in some embodiments, then orients the capture device 310 toward the POI 318 in the AOI 338, while attempting to capture the full AOI 338 in the FOV of the capture device 310.

In some examples, the capture device has a wide FOV, and selective cropping or selection of a sub-FOV within the FOV allows the base device to "move" the FOV of the capture device in response to the positional information and/or pointer information. FIG. 4-1 and FIG. 4-2 illustrate an embodiment of a method of selecting a sub-FOV with a presentation system, according to the present disclosure. In some embodiments, the base device includes a camera with a wide FOV 440. While in the tracking state, the base device selects a first sub-FOV 442-1 that includes the control device 406 based on the positional information of the control device 406. As described herein, the positional information of the control device 406 may include azimuth and inclination values relative to the base device. In such embodiments, the azimuth value is used to determine the horizontal position of the first sub-FOV 442-1 and the inclination value is used to determine the vertical position of the first sub-FOV 442-1.

When the presentation system changes to a POI state, in some embodiments, the base device receives pointer information from the control device 406 and determines a location of the POI 418 in the FOV 440 of the capture device, as shown in FIG. 4-2, based on the pointer information and positional information of the control device 406. The base device then selects a second sub-FOV 442-2 from within the FOV 440 based on the location of the POI 418.

In some embodiments, the location of the POI 418 is on or within an imaged object 404 within the FOV 440 of the capture device. In such embodiments, object detection and/or recognition, or other machine vision techniques such as optical character recognition and/or edge detection, can be used to select the second sub-FOV 442-2 to encompass the object 404. In some embodiments, the second sub-FOV 442-2 is at least partially selected based on an AOI, such as described in relation to FIG. 3-5.

While embodiments of transitioning a presentation system from capturing a control device in tracking state to capturing a POI (or AOI) in a POI state have been described, in some embodiments, it is desirable to direct the capture device (and/or a FOV thereof) to capture the presenter holding the control device and/or an object indicated by the POI and not simply the control device or the precise POI, alone. For example, a presenter who is gesturing with their hands while holding the control device may intentionally cause the base device to move a camera tracking the control device while the presenter does not otherwise move. Similarly, the POI measured by the control device (e.g., by the ranging device and orientation sensor) may be a location on an object of interest or in an AOI, which the presenter intends to present to the viewers of the presentation.

FIG. 5 is an example of object detection and/or recognition to stabilize tracking based on the positional information. In some embodiments, the base device orients a camera toward the control device 506, while in the tracking state, based on positional information 514 of the control device 506. In some embodiments, the camera images a human presenter 544 holding the control device 506. The base device (such as via a processor of the base device described in relation to FIG. 2) may evaluate the captured image and detect the presenter 544. In some embodiments, the presenter 544 is detected through object detection, image segmentation, edge detection, or other image recognition techniques. In some embodiments, detection of the presenter 544 includes the base device placing a bounding box 546 around the presenter 544. The base device may move and/or orient the capture device to keep the bounding box 546 (and/or as much as possible of the bounding box 546) in the FOV of the capture device during the tracking state. In some embodiments, detection of the presenter 544 includes the base device placing a centerpoint 548 on the presenter 544. In some embodiments, the base device may move and/or orient the capture device to keep the centerpoint 548 in the FOV of the capture device during the tracking state. In some embodiments, upon detection of the presenter 544 holding the control device 506, the base device tracks the presenter 544 so long as the positional information remains within the bounding box 546 or otherwise within the frame of the presenter 544.

Figure 6:
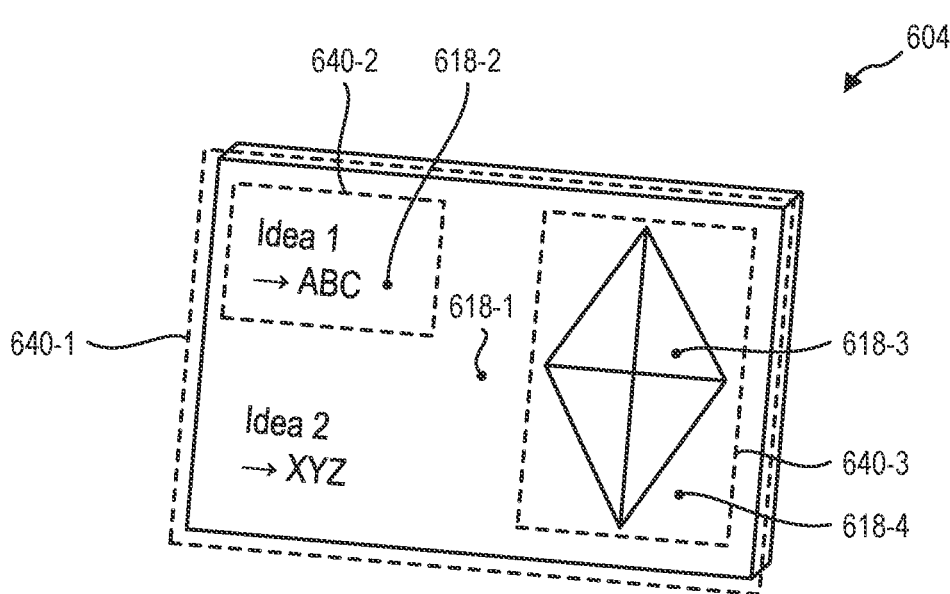
FIG. 6 is an example of object detection and/or recognition to stabilize or simplify tracking based on pointer information in a POI state, according to at least some embodiments of the present disclosure.

FIG. 6 is an example of object detection and/or recognition to stabilize or simplify tracking based on the pointer information in the POI state. When in the POI state, the base device moves and/or selects a FOV of the capture device, in some embodiments, based on an object 604 or portion of the object 604 indicated by the POI 618 and not the POI 618 itself.

In some embodiments, the POI indicated by the control device is located at or near an object or text that presenter intends to present to the viewers of the presentation. The FOV of the camera or other capture device may be adjusted to correspond to the object or text proximate to the POI. For example, FIG. 6 illustrates a whiteboard object 604. A first POI 618-1 is located at a center of the whiteboard object 604. When the presenter indicates the whiteboard object 604 with the first POI 618-1 at the center of the object 604, the base device selects a first FOV 640-1 that encompasses the entire whiteboard object 604. For example, the capture device may image the object 604 with a wide FOV, and edge detection or other machine vision techniques allows the base device to determine the boundaries of the indicated object 604.

In some embodiments, the presenter indicates a second POI 618-2 with the control device that is proximate to text on the whiteboard object 604. The base device, in some embodiments, recognizes the text (such as by optical character recognition or other machine vision techniques) and associated portions of the text on the whiteboard object 604. The base device can, therefore, select a second FOV 640-2 by movement of a gimbal, movement of a lens, or selection of a sub-FOV that encompasses the text proximate to the second POI 618-2. Similarly, the presenter, in some embodiments, indicates a third POI 618-3 with the control device that is proximate to a drawing or other graphic on the whiteboard object 604. The base device, in some embodiments, recognizes the graphic (such as by contrast-based edge detection or other machine vision techniques) and associated portions of the graphic on the whiteboard object 604. The base device can, therefore, select a third FOV 640-3 by movement of a gimbal, movement of a lens, or selection of a sub-FOV that encompasses the graphic proximate to the third POI 618-3.

The presentation system can provide intelligent adjustments to or selection of a FOV of the capture device while in the POI state to provide the viewer of the presentation more relevant information. Further, the FOV is selected by the base device to capture the object of interest during the presentation when the POI is within the selected FOV to limit movement of the FOV during the presentation. Moving the FOV based on any changes to the POI may render the FOV in the POI state subject to the level of stability (or instability) of the control device, meaning any shake or instability in the presenter's hand could be reflected by the FOV in the POI state. Similar to as described in relation to FIG. 5, unnecessary movement of the FOV during the presentation can be distracting or uncomfortable for a viewer. Selection of the FOV based on detected objects, text, or graphics proximate to the POI and not the POI location, itself, in some embodiments, stabilizes the FOV in the POI state and can better represent the intended presentation.

In some embodiments, the base device records a selected FOV, such as the third FOV 640-3 upon detecting and imaging an object, text, or graphic associated with a POI (such as the third POI 618-3). In some embodiments, a determination of a fourth POI 618-4 within a previous FOV (such as the third FOV 640-3) is interpreted as a request to return to capturing the previous FOV. In the illustrated embodiment of FIG. 6, the fourth POI 618-4 is interpreted as indicating the third FOV 640-3, despite the fourth POI 618-4 being in a different location than the third POI 618-3 that originally prompted the third FOV 640-3.

Figure 7:
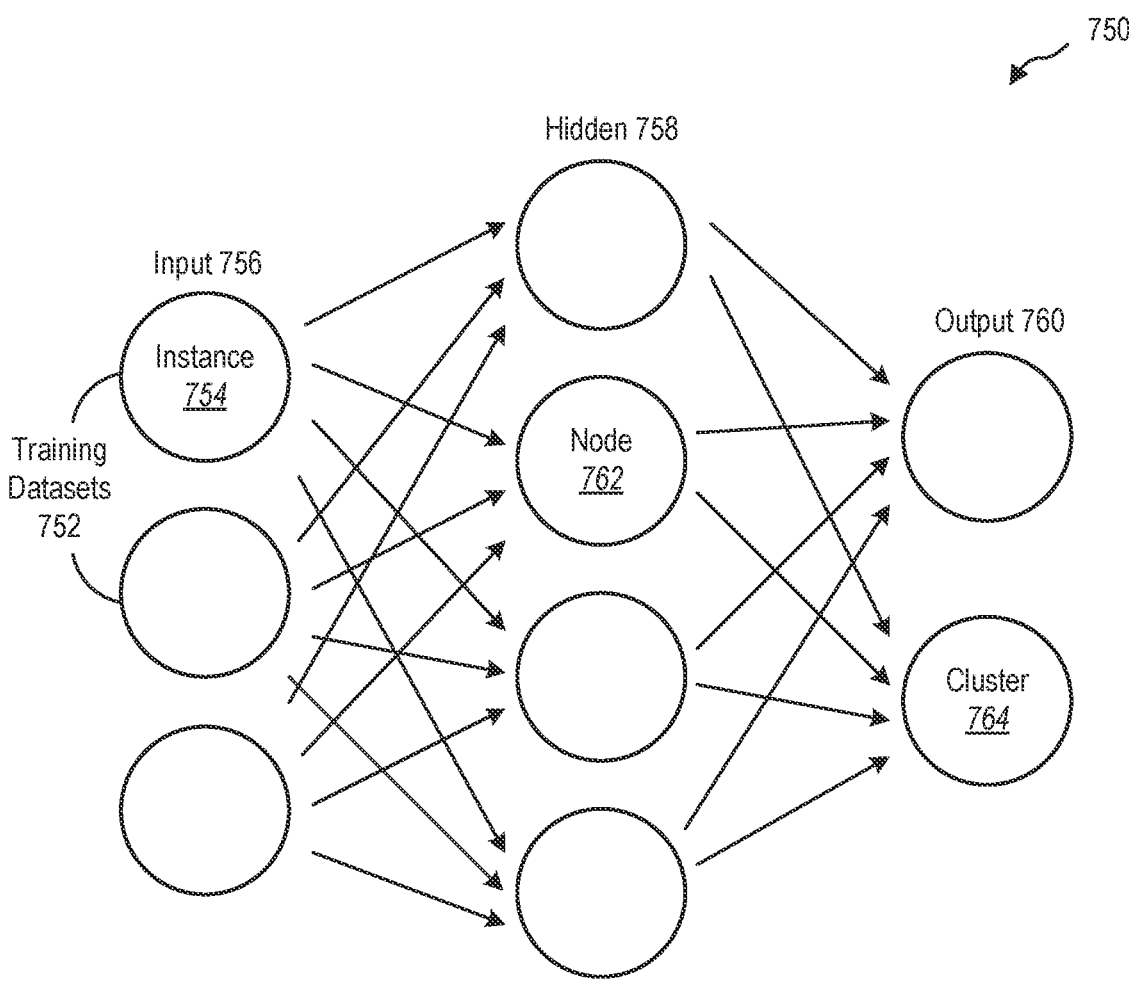
FIG. 7 is a schematic diagram of a machine learning model, according to at least some embodiments of the present disclosure.

In some embodiments, the base device includes a machine learning (ML) model, ML system, or ML-based vision model to detect the presenter (such as described in relation to FIG. 5) in the tracking state and/or objects, text, or graphics (such as described in relation to FIG. 6) in the POI state. FIG. 7 is a flowchart of an embodiment of an ML model 750 that may be used with any of the methods described herein. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as positional information, a POI location, an AOI location, an imaged presenter, an image object, text, graphics, audio, or other information collected by the base device.

In some embodiments, the machine learning system has a plurality of layers with an input layer 756 configured to receive at least one input training dataset 752 or input training instance 754 and an output layer 760, with a plurality of additional or hidden layers 758 therebetween. The training datasets can be input into the machine learning system to train the machine learning system and identify individual and combinations of labels or attributes of the training instances that allow the processor of the base device to improve image recognition and/or tracking of the base device. In some embodiments, the machine learning system can receive multiple training datasets concurrently and learn from the different training datasets simultaneously.

In some embodiments, the machine learning system includes a plurality of machine learning models that operate together. Each of the machine learning models has a plurality of hidden layers between the input layer and the output layer. The hidden layers have a plurality of input nodes (e.g., nodes 762), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters 764, to the output layer.

In some embodiments, each of the nodes 762 has a linear function and an activation function. The linear function may attempt to optimize or approximate a solution with a line of best fit, such as reduced power cost or reduced latency. The activation function operates as a test to check the validity of the linear function. In some embodiments, the activation function produces a binary output that determines whether the output of the linear function is passed to the next layer of the machine learning model. In this way, the machine learning system can limit and/or prevent the propagation of poor fits to the data and/or non-convergent solutions.

The machine learning model includes an input layer that receives at least one training dataset. In some embodiments, at least one machine learning model uses supervised training. In some embodiments, at least one machine learning model uses unsupervised training. Unsupervised training can be used to draw inferences and find patterns or associations from the training dataset(s) without known outputs. In some embodiments, unsupervised learning can identify clusters of similar labels or characteristics for a variety of training instances and allow the machine learning system to extrapolate the performance of instances with similar characteristics.

In some embodiments, semi-supervised learning can combine benefits from supervised learning and unsupervised learning. As described herein, the machine learning system can identify associated labels or characteristic between instances, which may allow a training dataset with known outputs and a second training dataset including more general input information to be fused. Unsupervised training can allow the machine learning system to cluster the instances from the second training dataset without known outputs and associate the clusters with known outputs from the first training dataset.

INDUSTRIAL APPLICABILITY

The present disclosure relates generally to systems and methods for presenting video information to a remote viewer. More particularly, the present disclosure relates to embodiments of systems and methods of controlling a presentation device to intelligently capture and transmit subjects or objects of interest during the live presentation. In some embodiments, a presentation system includes a base device and a control device. The base device includes a camera, microphone, or other capture device that records information from a live presentation and, in some embodiments, transmits the captured video and/or audio information. The control device is operable to data communicate with the base device and configured to provide positional and vector information to the base device. The positional and vector information instruct the base device to move a field of view (FOV) of the capture device and/or select a sub-FOV of the capture device based on a movement or orientation of the control device. In some embodiments, the control device includes a ranging sensor, such as a time-of-flight (TOF) sensor, that allows the control device to instruct the base device to image or record a point in space determined by the control device.

In a conventional presentation system, a camera may identify a tracked device, such as a handheld human interface device (HID) that a presenter holds. The camera may follow the presenter during the presentation. When presenting digital information, such as via software, a video presentation can display the digital information independently of the camera while the camera follows the presenter. However, during a hybrid presentation, when the object or subject of interest during the presentation is physically present local to (e.g., in the same physical environment as) the presenter, the camera remains tracked on the tracked device. The remote audience viewing the presentation on a display device is therefore unable to view the other object or subject of interest during the presentation without separate and control or manipulation of the capture device.

In some embodiments, systems and methods, according to the present disclosure, allow a presenter to instruct a base device including a camera, microphone, or another capture device to image or record the presenter or another object or subject of interest during the presentation automatically. In some embodiments, a control device is operable to data communicate with the base device to transmit positional information of the control device relative to the base device, and the base device tracks and records the area proximate to the control device. Upon receipt of a pointer request, such as by depressing an input button on the control device, the control device measures a distance to an object or subject of interest and measures a vector location from the control device. The control device and/or base device uses the vector information and positional information to change the tracking focus of the base device to the indicated object or subject of interest. In some embodiments, upon termination of the pointer request, the base device returns to tracking the control device based on the positional information.

In at least one example, a camera on a gimbal tracks a presenter on a stage holding a control device that transmits positional information to the gimbal. When the presenter presses a button on the control device to use a laser pointer of the control device to indicate a prototype model (i.e., object or subject of interest) on stage with the presenter, the control device measures a pointer position of the laser pointer relative to the control device. The control device transmits the pointer position to the gimbal, and the camera moves to image the pointer position and prototype model. Upon release of the button on the control device, the control device terminates transmission of the pointer position and returns to transmitting the positional information of the control device. The gimbal moves the camera back to the control device (and presenter) based on the positional information. Embodiments of control devices and base devices according to the present disclosure provide intuitive and semi-automated imaging and recording of the presentation without predetermined scripting or camera planning.

In some embodiments, the presentation system includes a control device and a base device. The base device includes a capture device and, in some embodiments, a gimbal or other device for moving a FOV of the capture device. In some embodiments, the capture device is stationary and the FOV of the capture device moves through digital selection of a sub-FOV, as will be described in more detail herein.

In some embodiments, the base device is operable to data communicate with the control device. For example, the base device and control device may be in wireless communication with one another via radio frequency (RF) communications. In some embodiments, the RF communications transmit at least positional information of the control device relative to the base device. In some embodiments, the wireless communication device transmits pointer information from the control device to the base device.

In some embodiments, the positional information is determined by the wireless communication device that transmits the positional information. For example, the positional information may be measured by orthogonal directional and positional RF measurements of an RF transceiver, such as a WiFi transceiver, a Bluetooth transceiver, or other frequency and/or protocol transceiver that also transmits the positional information. In some embodiments, the positional information is measured by dedicated positional sensor, such as an ultra-wideband (UWB) transceiver. In some examples, a UWB transceiver of the control device and the base device measures the relative position of the control device and the base device, while a separate wireless communication device transmits the positional information and/or other information between the control device and the base device.

In some embodiments, the pointer information is determined by the control device. The pointer information describes the location of a point-of-interest (POI) relative to the position of the control device. For example, the pointer information may be a pointer vector relative to the control device as an origin of the point vector. In some embodiments, the control device includes an orientation sensor, such as an accelerometer, and ranging device, such as a time-of-flight (TOF) sensor, to measure the orientation of the control device and a distance from the control device to the POI. In some embodiments, the control device includes a visible light, such as a laser, that visually indicates the POI to the presenter or viewers of the presentation.

In some embodiments, the presentation system moves the capture device to image the control device and area around the control device based on the positional information, and the presentation system moves the capture device based on the pointer information and the positional information. For example, the presentation system determines the relative position of the control device to the base device 108 by the positional information, and the presentation system determines the relative position of the POI and the base device by the combination of the positional information and the pointer information.

The control device, in some embodiments, includes a processor that is in communication with a hardware storage device. The hardware storage device has instructions stored thereon that, when executed by the processor, cause the control device to perform at least part of any method described herein. In some examples, the processor is a general-use processor. In some examples, the processor is a system on chip or application specific integrated circuit. In some embodiments, the hardware storage device is a non-transient storage device including any of RAM, ROM, EEPROM, magnetic disk storage or other magnetic storage devices, or any other medium which can be used to store desired program code means in the form of computer-executable instructions or data structures and which can be accessed by a general purpose or special purpose processor.

The processor is further in communication with a positional sensor configured to determine positional information relative to the base device and an orientation sensor and a ranging device configured to determine pointer information relative to the control device.

In some embodiments, the positional sensor of the control device communicates with a positional sensor of the base device. For example, the positional sensors may be UWB transceivers that communicate with one another to determine the relative position of one another in three-dimensions. In some embodiments, the positional sensors are RF antennas that determine at least one of azimuth, inclination, and distance between the control device and the base device. In some embodiments, the positional information is determined at the control device and transmitted to the base device. In some embodiments, the positional information is determined at both the control device and the base device. In some embodiments, the positional information is determined at the base device only. For example, the control device transmits a beacon signal to the base device, and the control device may be unaware of the relative location of the control device to the base device, as the base device tracks the control device, and the control device need not be aware of the relative position.

In some embodiments, the orientation sensor is or includes an accelerometer, a gyroscope, a compass, or combinations thereof. For example, the orientation sensor measures the orientation of the control device in space, such as measuring the azimuth and inclination of the control device. In some embodiments, the orientation sensor measures the orientation of the ranging device in space. For example, the ranging device emits a signal to measure a distance from the ranging device to a POI. The orientation sensor is configured to measure the axial orientation of the signal emitted by the ranging device.

In some embodiments, the ranging device emits an infra-red (IR) or other electromagnetic signal and measures a distance from the ranging device to a POI by measuring a TOF of the signal to (and reflected by) an object at the POI. For example, the ranging device emits an IR signal that travels from the ranging device to the POI, reflects from a surface of an object at the POI, and the ranging device detects the reflected signal. In some embodiments, the ranging device measures the distance to the POI by the elapsed time of the round-trip signal. The ranging device and orientation sensor, in combination, can measure a pointer vector from the control device to the POI.

The control device transmits at least one of the positional information and pointer information to the base device via a communication device. The base device receives the transmitted information with a second communication device. In some embodiments, the base device includes a processor in communication with the communication device and a hardware storage device operable to data communicate with the processor that has instructions stored thereon that, when executed by the processor, cause the base device to perform at least part of any method described herein.

The processor of the base device is further in communication with a capture device. In some embodiments, the base device further includes a gimbal or other device for supporting and moving at least part of the capture device. The processor may be in communication with the gimbal or other device to control the movement of the capture device. In some embodiments, the base device lacks a gimbal or other device for moving at least part of the capture device. In such embodiments, the processor receives video information or audio information from the capture device in a full FOV, and the processor selects a sub-FOV from the full FOV based at least partially on the positional information and/or the pointer information.

In some embodiments, the capture device is or includes a camera to capture video information. In some embodiments, the capture device is or includes a directional microphone or focused microphone (i.e., parabolic) to capture audio information from a specific direction or audio field. In some embodiments, the capture device records both video information and audio information.

In some embodiments, a control device and the base device communicate with one another. The base device obtains positional information of the relative position of the control device relative to the base device. In some embodiments, the positional information includes at least azimuthal information. For example, some presentations occur within a single horizontal plane, and azimuthal information may be sufficient to track the position of the control device relative to the base device during the presentation. In some embodiments, the positional information includes at least azimuthal and inclination information. For example, some presentations with horizontal and vertical movement still occur with limited changes in distance from the capture device (such as presentations on a stage), and azimuthal and inclination information may be sufficient to track the position of the control device relative to the base device. In some embodiments, the positional information includes at least azimuthal, inclination, and depth information. For example, the capture device may have a focal length, such as a camera with an adjustable lens (or lens stack) that allows for adjustments according to depth of captured object or area.

In some embodiments, the positional information is determined at the control device and transmitted to the base device. In some embodiments, the positional information is determined at both the control device and the base device simultaneously, such as in some UWB systems. In some embodiments, the positional information is determined at the base device, such as when the control device is either passive or when the control device transmits a beacon signal, which the base device then uses to calculate the positional information of the control device.

In some embodiments, the control device transitions to a POI state, such as by a user depressing a pointer button on the control device. In some embodiments, the control device emits a signal to measure a distance from the control device to a POI, as described herein. The orientation sensor and ranging device of the control device determine the pointer information from the control device to the POI, for example, in a pointer vector. The presentation system, in some embodiments, sums the pointer information and the positional information to determine a POI vector from the base device to the POI. For example, the presentation system sums the pointer vector (from the control device to the POI) and a positional vector (from the base device to the control device) while in the POI state to determine the POI vector from the base device to the POI.

In some embodiments, a pointer request initiates the POI state in which the control device transmits the pointer information to the base device. In some embodiments, the pointer request is received from the pointer button on the control device. In some examples, the presentation system is in the POI state while the pointer button is held depressed. In some examples, the presentation system is toggled between the tracking state and the POI state upon the control device receiving the pointer request when the pointer button is pressed. For example, the presentation system is toggled between the tracking state and the POI state upon receiving a first pointer request when the pointer button is pressed and the base device is in the tracking state, and the presentation system is toggled between the POI state and the tracking state upon receiving a second pointer request when the pointer button is pressed and the base device is in the POI state.

While in the POI state, the presentation system images or records the POI with the base device (and capture device thereof). For example, the base device moves the capture device, such as by a gimbal, based on the POI vector from the base device to the POI. In some embodiments, while in POI state, the base device updates the orientation (or FOV) of the capture device to image or record the POI indicated by the control device. For example, while the pointer button is depressed, the control device transmits updated pointer information while the control device moves and the POI moves. In some embodiments, the presentation system enters the POI state and moves the capture device to image or record the POI until the control device terminates the POI state and transmits a termination request to the base device. Upon receipt of the termination request, the base device terminates the POI state and returns to the tracking state, during which the base device directs the capture device at the control device.

In some embodiments, the presentation system returns to a tracking state of the control device. For example, the pointer button of the control device may be released, which provides a termination request to the base device by ending the prior pointer request and terminates the POI state. In another example, the pointer button of the control device is depressed a second time, which transmits a termination request to the base device to terminate the POI state. In some embodiments, the base device returns to an original orientation and position of the control device upon termination of the POI state. In some embodiments, new positional information is obtained by the base device (either by determination at the base device or received from the control device), and the base device orients the capture device based on the new positional information of the control device.

In some embodiments, the presenter wants to indicate an object or region that is larger than the POI. In some embodiments, the control device indicates an area of interest (AOI) on the object by pointing the control device at the object and gesturing the control device in a circle, a rectangle, a square, an ellipse, an irregular shape, or other shape that indicates an area. In some embodiments, the orientation sensor and the ranging device of the control device record measurements substantially continuously while the pointer button remains depressed. In some embodiments, the control device calculates the AOI indicated by the measured user's movement of the control device, and the pointer information includes area information of the AOI at the end of the pointer vector. In some embodiments, the control device transmits a plurality of pointer vectors in the pointer information to the base device, and the base device calculates the area information of the AOI at the end of the POI vector. The base device, in some embodiments, then orients the capture device toward the POI in the AOI, while attempting to capture the full AOI in the FOV of the capture device.

In some examples, the capture device has a wide FOV, and selective cropping or selection of a sub-FOV within the FOV allows the base device to "move" the FOV of the capture device in response to the positional information and/or pointer information. In some embodiments, the base device includes a camera with a wide FOV. While in the tracking state, the base device selects a first sub-FOV that includes the control device based on the positional information of the control device. As described herein, the positional information of the control device may include azimuth and inclination values relative to the base device. In such embodiments, the azimuth value is used to determine the horizontal position of the first sub-FOV and the inclination value is used to determine the vertical position of the first sub-FOV.

When the presentation system changes to a POI state, in some embodiments, the base device receives pointer information from the control device and determines a location of the POI in the FOV of the capture device, based on the pointer information and positional information of the control device. The base device then selects a second sub-FOV from within the FOV based on the location of the POI.

In some embodiments, the location of the POI is on or within an imaged object within the FOV of the capture device. In such embodiments, object detection and/or recognition, or other machine vision techniques such as optical character recognition and/or edge detection, can be used to select the second sub-FOV 442-2 to encompass the object 404. In some embodiments, the second sub-FOV 442-2 is at least partially selected based on an AOI, such as described in relation to FIG. 3-5.

While embodiments of transitioning a presentation system from capturing a control device in tracking state to capturing a POI (or AOI) in a POI state have been described, in some embodiments, it is desirable to direct the capture device (and/or a FOV thereof) to capture the presenter holding the control device and/or an object indicated by the POI and not simply the control device or the precise POI, alone. For example, a presenter who is gesturing with their hands while holding the control device may intentionally cause the base device to move a camera tracking the control device while the presenter does not otherwise move. Similarly, the POI measured by the control device (e.g., by the ranging device and orientation sensor) may be a location on an object of interest or in an AOI, which the presenter intends to present to the viewers of the presentation.

In some embodiments, the base device orients a camera toward the control device, while in the tracking state, based on positional information of the control device. In some embodiments, the camera images a human presenter holding the control device. The base device (such as via a processor of the base device described herein) may evaluate the captured image and detect the presenter. In some embodiments, the presenter is detected through object detection, image segmentation, edge detection, or other image recognition techniques. In some embodiments, detection of the presenter includes the base device placing a bounding box around the presenter. The base device may move and/or orient the capture device to keep the bounding box (and/or as much as possible of the bounding box) in the FOV of the capture device during the tracking state. In some embodiments, detection of the presenter includes the base device placing a centerpoint on the presenter. In some embodiments, the base device may move and/or orient the capture device to keep the centerpoint in the FOV of the capture device during the tracking state. In some embodiments, upon detection of the presenter holding the control device, the base device tracks the presenter so long as the positional information remains within the bounding box or otherwise within the frame of the presenter.

In some embodiments, the presentation system includes object detection and/or recognition to stabilize or simplify tracking based on the pointer information in the POI state. When in the POI state, the base device moves and/or selects a FOV of the capture device, in some embodiments, based on an object or portion of the object indicated by the POI and not the POI, itself.

In some embodiments, the POI indicated by the control device is located at or near an object or text that presenter intends to present to the viewers of the presentation. The FOV of the camera or other capture device may be adjusted to correspond to the object or text proximate to the POI. In an example, a first POI is located at a center of a whiteboard object. When the presenter indicates the whiteboard object with the first POI at the center of the object, the base device selects a first FOV that encompasses the entire whiteboard object. For example, the capture device may image the object with a wide FOV, and edge detection or other machine vision techniques allows the base device to determine the boundaries of the indicated object.

In some embodiments, the presenter indicates a second POI with the control device that is proximate to text on the whiteboard object. The base device, in some embodiments, recognizes the text (such as by optical character recognition or other machine vision techniques) and associated portions of the text on the whiteboard object. The base device can, therefore, select a second FOV by movement of a gimbal, movement of a lens, or selection of a sub-FOV that encompasses the text proximate to the second POI. Similarly, the presenter, in some embodiments, indicates a third POI with the control device that is proximate to a drawing or other graphic on the whiteboard object. The base device, in some embodiments, recognizes the graphic (such as by contrast-based edge detection or other machine vision techniques) and associated portions of the graphic on the whiteboard object. The base device can, therefore, select a third FOV by movement of a gimbal, movement of a lens, or selection of a sub-FOV that encompasses the graphic proximate to the third POI.

The presentation system can provide intelligent adjustments to or selection of a FOV of the capture device while in the POI state to provide the viewer of the presentation more relevant information. Further, the FOV is selected by the base device to capture the object of interest during the presentation when the POI is within the selected FOV to limit movement of the FOV during the presentation. Moving the FOV based on any changes to the POI may render the FOV in the POI state subject to the level of stability (or instability) of the control device, meaning any shake or instability in the presenter's hand could be reflected by the FOV in the POI state. As described herein, unnecessary movement of the FOV during the presentation can be distracting or uncomfortable for a viewer. Selection of the FOV based on detected objects, text, or graphics proximate to the POI and not the POI location itself, in some embodiments, stabilizes the FOV in the POI state and can better represent the intended presentation.

In some embodiments, the base device records a selected FOV, such as the third FOV upon detecting and imaging an object, text, or graphic associated with a POI (such as the third POI). In some embodiments, a determination of a fourth POI within a previous FOV (such as the third FOV) is interpreted as a request to return to capturing the previous FOV.

In some embodiments, the base device includes a machine learning (ML) model, ML system, or ML-based vision model to detect the presenter in the tracking state and/or objects, text, or graphics in the POI state. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other machine learning algorithm or architecture that learns and approximates complex functions and generate outputs based on a plurality of inputs provided to the machine learning model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as positional information, a POI location, an AOI location, an imaged presenter, an image object, text, graphics, audio, or other information collected by the base device.

In some embodiments, the machine learning system has a plurality of layers with an input layer configured to receive at least one input training dataset or input training instance and an output layer, with a plurality of additional or hidden layers therebetween. The training datasets can be input into the machine learning system to train the machine learning system and identify individual and combinations of labels or attributes of the training instances that allow the processor of the base device to improve image recognition and/or tracking of the base device. In some embodiments, the machine learning system can receive multiple training datasets concurrently and learn from the different training datasets simultaneously.

In some embodiments, the machine learning system includes a plurality of machine learning models that operate together. Each of the machine learning models has a plurality of hidden layers between the input layer and the output layer. The hidden layers have a plurality of input nodes (e.g., nodes), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters, to the output layer.

In some embodiments, each of the nodes has a linear function and an activation function. The linear function may attempt to optimize or approximate a solution with a line of best fit, such as reduced power cost or reduced latency. The activation function operates as a test to check the validity of the linear function. In some embodiments, the activation function produces a binary output that determines whether the output of the linear function is passed to the next layer of the machine learning model. In this way, the machine learning system can limit and/or prevent the propagation of poor fits to the data and/or non-convergent solutions.

The machine learning model includes an input layer that receives at least one training dataset. In some embodiments, at least one machine learning model uses supervised training. In some embodiments, at least one machine learning model uses unsupervised training. Unsupervised training can be used to draw inferences and find patterns or associations from the training dataset(s) without known outputs. In some embodiments, unsupervised learning can identify clusters of similar labels or characteristics for a variety of training instances and allow the machine learning system to extrapolate the performance of instances with similar characteristics.

In some embodiments, semi-supervised learning can combine benefits from supervised learning and unsupervised learning. As described herein, the machine learning system can identify associated labels or characteristic between instances, which may allow a training dataset with known outputs and a second training dataset including more general input information to be fused. Unsupervised training can allow the machine learning system to cluster the instances from the second training dataset without known outputs and associate the clusters with known outputs from the first training dataset.

The present disclosure relates to systems and methods for presenting a hybrid presentation to a viewer according to at least the examples provided in the sections below:

Clause 1. A control device comprising: a processor; a communication device operable to data communicate with the processor; a positional sensor operable to data communicate with the processor; an orientation sensor operable to data communicate with the processor; a ranging device operable to data communicate with the processor; a hardware storage device operable to data communicate with the processor, the hardware storage device having instructions stored thereon that, when executed by the processor, cause the control device to: upon receiving a pointer request: determine pointer information relative to the control device from the ranging device and the orientation sensor, and transmit the pointer information to a base device.

Clause 2. The control device of clause 1, wherein the pointer information is a vector.

Clause 3. The control device of clause 1 or 2, wherein the pointer information is relative to the base device.

Clause 4. The control device of clause 1 or 2, wherein the pointer information is relative to the control device.

Clause 5. The control device of any preceding clause, wherein the instructions further include: determine positional information relative to a base device from the positional sensor of the control device, and transmit the positional information to the base device.

Clause 6. The control device of clause 5, wherein the instructions further include: based at least partially on termination of the pointer request, transmit updated positional information to the base device.

Clause 7. The control device of any preceding clause, where in the ranging device is a time-of-flight sensor.

Clause 8. The control device of any preceding clause, wherein the orientation sensor includes an accelerometer.

Clause 9. The control device of any preceding clause, wherein the positional sensor includes an ultra-wideband transceiver.

Clause 10. A presentation system comprising: a control device including: a processor, a communication device operable to data communicate with the processor, a positional sensor operable to data communicate with the processor, an orientation sensor operable to data communicate with the processor, a ranging device operable to data communicate with the processor, and a hardware storage device operable to data communicate with the processor, the hardware storage device having instructions stored thereon that, when executed by the processor, cause the control device to: based at least partially on receiving a pointer request: determine pointer information relative to the control device from the ranging device and the orientation sensor, and transmit the pointer information; and a base device including: a camera having a field of view (FOV), a processor, and a hardware storage device having instructions stored thereon that, when executed by the processor, cause the base device to: obtain the positional information of the control device, move the FOV based at least partially on the positional information, receive the pointer information, and in response to receiving the pointer information, move the FOV based at least partially on the pointer information.

Clause 11. The presentation system of clause 10, wherein the base device includes a gimbal supporting the camera, and moving the FOV includes moving the camera with the gimbal.

Clause 12. The presentation system of clause 10, wherein moving the FOV includes selecting a sub-FOV from a camera FOV.

Clause 13. The presentation system of any of clauses 10-12, wherein moving the FOV based at least partially on the pointer information includes determining a POI vector by summing the pointer information and the positional information.

Clause 14. The presentation system of any of clauses 10-13, wherein obtaining the position information of the control device includes determining the positional information with an ultra-wideband transceiver at the base device.

Clause 15. A method comprising: at a base device: obtaining positional information of a control device; moving a field of view (FOV) of a capture device based on the positional information in a tracking state; obtaining pointer information of a point-of-interest (POI) from the control device; changing to a POI state; and moving the FOV of the capture device based on the pointer information while in the POI state.

Clause 16. The method of clause 15, wherein changing to a POI state includes receiving a pointer request from the control device.

Clause 17. The method of clause 16, wherein the base device remains in the POI state while the base device continues to receive the pointer request.

Clause 18. The method of clause 16, wherein the base device remains in the POI state until the base device receives a second pointer request.

Clause 19. The method of any of clauses 15-18, wherein moving the FOV includes moving a capture device of the base device.

Clause 20. The method of any of clauses 15-19, wherein moving the FOV includes selecting a sub-FOV of a capture device of the base device.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A control device comprising:
a processor;
a communication device operable to data communicate with the processor;
a positional sensor operable to data communicate with the processor;
an orientation sensor operable to data communicate with the processor;
a ranging device operable to data communicate with the processor;
a hardware storage device operable to data communicate with the processor, the hardware storage device having instructions stored thereon and executable by the processor to cause the control device to:
based at least partially on receiving a pointer request:
determine pointer information relative to the control device from the ranging device and the orientation sensor, and
transmit the pointer information to a base device.

2. The control device of claim 1, wherein the pointer information is a vector.

3. The control device of claim 1, wherein the pointer information is relative to the base device.

4. The control device of claim 1, wherein the pointer information is relative to the control device.

5. The control device of claim 1, wherein the instructions further cause the control device to:
determine positional information relative to a base device from the positional sensor of the control device, and
transmit the positional information to the base device.

6. The control device of claim 5, wherein the instructions further include:
based at least partially on termination of the pointer request, transmitting updated positional information to the base device.

7. The control device of claim 1, where in the ranging device is a time-of-flight sensor.

8. The control device of claim 1, wherein the orientation sensor includes an accelerometer.

9. The control device of claim 1, wherein the positional sensor includes an ultra-wideband transceiver.

10. A presentation system comprising:
a control device including:
a processor,
a communication device operable to data communicate with the processor,
a positional sensor operable to data communicate with the processor,
an orientation sensor operable to data communicate with the processor,
a ranging device operable to data communicate with the processor, and
a hardware storage device operable to data communicate with the processor, the hardware storage device having instructions stored thereon and executable by the processor to cause the control device to:

based at least partially on receiving a pointer request:
determine pointer information relative to the control device from the ranging device and the orientation sensor, and
transmit the pointer information; and
a base device including:
a camera having a field of view (FOV),
a processor, and
a hardware storage device having instructions stored thereon and executable by the processor to cause the base device to:
obtain positional information of the control device,
move the FOV based at least partially on the positional information,
receive the pointer information, and
based at least partially on receiving the pointer information, move the FOV based at least partially on the pointer information.

11. The presentation system of claim 10, wherein the base device includes a gimbal supporting the camera, and moving the FOV includes moving the camera with the gimbal.

12. The presentation system of claim 10, wherein moving the FOV includes selecting a sub-FOV from a camera FOV.

13. The presentation system of claim 10, wherein moving the FOV based at least partially on the pointer information includes determining a POI vector by summing the pointer information and the positional information.

14. The presentation system of claim 10, wherein obtaining the position information of the control device includes determining the positional information with an ultra-wide-band transceiver at the base device.

15. A method comprising:
at a base device:
in a tracking state:
obtaining positional information of a control device;
moving a field of view (FOV) of a capture device based on the positional information in a tracking state, wherein the position information indicates a location of the control device relative to the base device;
changing to a POI state;
in the POI state:
obtaining pointer information of a point-of-interest (POI) from the control device; and
moving the FOV of the capture device based on the pointer information while in the POI state.

16. The method of claim 15, wherein changing to a POI state includes receiving a pointer request from the control device.

17. The method of claim 16, wherein the base device remains in the POI state while the base device continues to receive the pointer request.

18. The method of claim 16, wherein the base device remains in the POI state until the base device receives a second pointer request.

19. The method of claim 15, wherein moving the FOV includes moving a capture device of the base device.

20. The method of claim 15, wherein moving the FOV includes selecting a sub-FOV of a capture device of the base device.

* * * * *